J. A. DAVIS.

Ruffling Attachment for Sewing-Machines.

No. 8,176. Reissued April 16, 1878.

WITNESSES.

C. F. Brown

Melville Church

INVENTOR

John A. Davis

By Hill & Ellsworth, his Attorneys.

N. PETERS, PHOTO-LITHOGRAPHER, WASHINGTON, D. C.

UNITED STATES PATENT OFFICE.

JOB A. DAVIS, OF WATERTOWN, NEW YORK.

IMPROVEMENT IN RUFFLING ATTACHMENTS FOR SEWING-MACHINES.

Specification forming part of Letters Patent No. 93,063, dated July 27, 1869; Reissue No. 8,176, dated April 16, 1878; application filed June 30, 1873.

*To all whom it may concern:*

Be it known that I, JOB A. DAVIS, of Watertown, in the county of Jefferson and State of New York, have invented certain new and useful Improvements in Ruffling Attachments for Sewing-Machines; and I do hereby declare that the following specification, taken in connection with the drawings furnished, is a full, clear, and exact description thereof, which will enable others skilled in the art to make and use the same.

Figure 1:
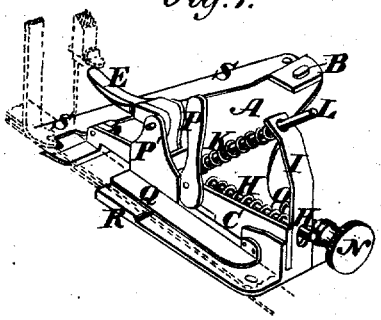
Figure 4:
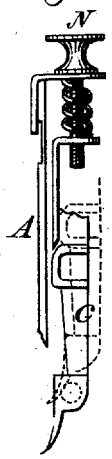
Figure 5:
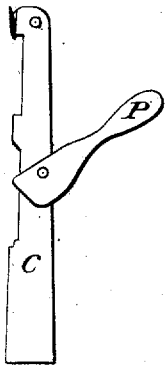
Figure 2:
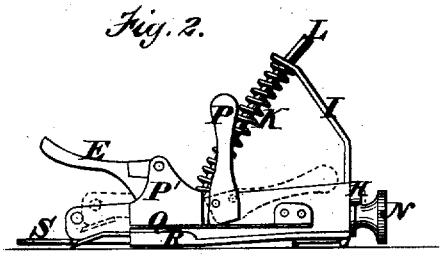
Figure 3:
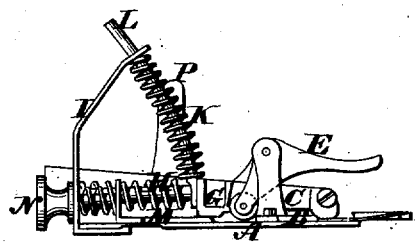

Figure 1 represents a view of my invention in perspective. Fig. 2 is a side view of the same; Fig. 3, side view taken from the opposite side to that shown in Fig. 2; Fig. 4, means for adjusting the gathering-blade; Fig. 5, means for elevating the gathering-blade in a fixed position above and free from contact with the material or cloth.

Similar letters of reference in the accompanying drawings denote the same parts.

My invention relates to that class of ruffling attachments for sewing-machines in which a reciprocating gathering-blade is operated through the medium of the needle-bar; and has for its object the rendering of such attachments more complete and efficient in their operations; and to that end I have constructed an attachment embodying the following features, which serve to insure a more positive and decided operation of parts, as well as a greater accuracy or perfection in the work performed, at the same time avoiding all unnecessary strain upon the needle while the gathers are being formed; and it consists, first, in the combination, in a gathering attachment, of a frame, a reciprocating gathering-blade, and an actuating-lever, adapted to be operated by the needle-bar, for actuating said gathering-blade; second, in the combination, with the frame and gathering-blade, of an adjusting medium for regulating the width of the gathers to be formed; third, in the combination, with the frame, gathering-blade, and actuating-lever, of a supplemental presser pad or foot, acting beneath the presser-bar and serving as a smoother to assist the gathering-blade in forming gathers or ruffles; fourth, in the combination of a spring with the gathering-blade and elbow-lever, the said parts being so arranged that after the needle-bar has completed its downward movement and is ascending, the spring will act to carry forward the gathering-blade to form the gathers; fifth, in the combination, with a reciprocating ruffling-blade and its operating device, of a mechanism, arranged in relation to said blade, whereby it may be thrown out of operation, to admit of the machine sewing plain work, or into operation, to form ruffles without removing the attachment from the machine; sixth, in the combination of the self-acting smoother with a ruffling attachment, which shall operate to smooth the ruffle, and the piece of cloth or band to which it is secured, as both are passing or fed through the machine; seventh, in the combination, with a ruffling attachment, of means for separating and smoothing the goods, operated upon automatically and simultaneously, consisting of blades or plates arranged upon and forming a part of the frame proper of the said attachment.

Referring to the said drawings, A represents the bed plate or frame, to which is secured and upon which operates the working parts of the attachment, and it may be attached to a sewing-machine by a screw in the opening provided for the same, which is represented at B.

The gatherer or blade is arranged to work in suitable guides connected with the frame proper, so as to be capable of reciprocating longitudinally toward and from the needle of the sewing-machine. In practice the fabric to be gathered passes under the gathering-blade and presser-foot and the supplemental presser or smoother S, so that the edge of the blade shall act upon the upper surface of the material, and push it forward to form the gathers or folds. That part of the gathering-blade which engages the cloth is represented as being provided with a slot for the passage of the needle, and is preferably serrated, to insure a more rigid grasp upon the goods in forming the gathers.

E represents an angle or elbow lever, for reciprocating the gathering-blade, which is operated from the needle-bar by engaging a projection thereon. This lever is secured at its elbow by a screw or pin, connecting the same to the post or upright. The short arm of the lever extends downward, so as to engage with the gathering device, and by which means the same is actuated. The gatherer is pressed down upon by a spring, K, so as to increase the pressure upon the goods or materials to be gathered, and is held partially supported in position by a rod, H, operating through standard I, upon and forming a part of the frame, said spring being arranged between the standard I and the projection G upon the gatherers. When it is desired to form a ruffle and sew it to a band or strip of material, the piece to be ruffled is carried under the gathering-blade and supplemental foot and cloth-presser of the sewing-machine, while the other piece is passed over the ruffling-blade and under the presser and the supplemental foot. The needle-bar, being in motion, operates the elbow-lever, and thereby draws back the gathering-blade, while a spring, H, acts to move it forward. These two mechanisms serve to space and form the gathers upon the strip operated upon. The gatherer being moved forward by the spring H, it can move forward no faster than the needle-bar ascends; therefore the folds or gathers will not be unduly crowded against the needle. When the needle-bar descends, being in contact with the long arm of the elbow-lever, the gatherer begins to recede; and this device should be so adjusted that at the same time the said gatherer begins to move the needle shall enter the cloth, and prevent the retraction of the gathers. The needle and thread are not carried directly through the gathers; but the perforation takes place in the rear of each successive gather, so that, in fact, each stitch embraces or envelops a gather.

M is a gage-piece, adjustable backward and forward by a lever, N, and spring O, and having its forward edge inclined or beveled. This piece serves to adjust the length or width of the gathers in the following manner: The descent of the needle-bar, as before stated, moves back the gathering-blade through the intermediary of the elbow-lever. As the back movement of the gatherer continues, the lower face of the projection G is caused to move up the inclined edge of the gage M, and so lift the edge of the feed-blade off the goods. When the needle rises and releases the lever E, the spring upon rod H assists to move the gatherer forward down the inclined edge or end of the gage M, the period of its descent being previously determined by the adjustment of the position of the inclined end of the gage, which also determines the size or fullness of the gathers. The incline M permits the lever to slightly lift the gathering-blade to clear the cloth. The employment of the friction-roller reduces the friction between the end of the lever and the engaging parts or projection.

K is an additional spring, surrounding a rod, L, placed in an inclined position, one end of the rod playing through the upright I, and the opposite end spanning the rod H, just in rear of the projection G upon the gatherer. S is a long spring-piece, secured at one end to the bed plate or frame of the attachment, and is free at the opposite end, which is of the proper shape and size and so arranged as to come directly beneath the presser-foot of the sewing-machine, to serve as a supplement to the presser-foot and a working-surface, against which the gathering-blade forms the gathers. It also serves as a means for supplying the necessary pressing-surface at two sides of the needle. If, however, this supplement to the presser-foot is not employed, the attachment will operate to gather successfully against the ordinary presser-foot, but not so satisfactorily.

Q is a spring-piece secured to an upright on the frame of the attachment; and R is a thin piece of metal, located immediately beneath it, attached loosely at one end to the bed-plate, so that its forward end may rest by its own gravity upon the cloth or cloth-plate of the machine. The piece R is made sufficiently thick to separate the two pieces of cloth as they are passing through the machine, and long enough to extend forward to the gathering-blade when retracted, and yet permit the said blade to play freely without any risk of acting upon the upper piece, and it is made heavy enough to act as a smoother of the lower fabric, while the spring Q is made to press upon it sufficiently to act as a smoother for the upper piece of cloth, which passes between it and the piece R.

Such an arrangement of self-acting smoothers, operating as they do upon both fabrics before they reach the gathering device, relieves the operator from the necessity of constant attendance to keep the goods smooth.

If desired, the parts Q K, while desirable in the attachment, may both be dispensed with, and the gathering device would work perfectly. At this stage, in many kinds of work where gathered goods are stitched to plain goods, it is often required to sew both fabrics together for a little distance before gathering at all, and also to do the same after the gathers are formed.

Having thus set forth my invention, what I claim as new, and desire to secure by Letters Patent of the United States of America, is—

1. The combination, in a gathering or ruffling attachment for sewing-machines, of a supporting-frame, a vibratory elbow-lever, adapted to be operated from or by the needle-bar, and a reciprocating gathering-blade, substantially as set forth.

2. The combination, with the gathering-blade and elbow-lever, adapted to withdraw said gathering-blade, of a spring, arranged to advance said blade and assist in the formation of gathers, substantially as set forth.

3. A ruffling attachment adapted to be secured upon the cloth-plate of a sewing-machine, and operated by the needle-bar thereof, consisting of a frame, elbow-lever, gatherer, and a spring to assist the latter in its action, substantially as and for the purposes set forth.

4. The combination, in a gathering attachment for sewing-machines, adapted to be operated by a bell-crank lever, of a reciprocating gathering-blade and a supplemental presser foot or pad, adapted to extend beneath the presser-bar of said machine, substantially as and for the purposes set forth.

5. In a ruffling attachment adapted to be operated by an elbow-lever from the needle-bar of a sewing-machine, the combination, with its frame, reciprocating gathering-blade, and lever, of an adjusting mechanism for varying the width of the gathers to be formed, substantially as set forth.

6. In a gathering or ruffling attachment operated by a bell-crank lever from a needle-bar of a sewing-machine, a gathering-blade, adapted to be held in suspension above the material operated upon, to prevent the formation of gathers, when desired, substantially as set forth.

7. In a ruffling or gathering attachment operated by a bell-crank lever from the needle-bar of a sewing-machine, the combination of an elastic or yielding plate with a gathering-blade, which plate serves as a supplemental presser and stop, against which the gathers are formed, and by which means said gathers may be smoothed, substantially as set forth.

8. In a ruffling attachment adapted to be operated through the medium of an elbow or bell-crank lever and the needle-bar of a sewing-machine, the combination, with the gathering-blade and the frame of the attachment, of an adjusting-screw and connecting mechanism, whereby the fullness of the ruffles or gathers are regulated, substantially as described.

9. A ruffling attachment adapted to be secured to the cloth-plate of a sewing-machine, and to be operated from or by the needle-bar through the medium of a bell-crank lever, having a reciprocating gatherer, a plate for separating the materials operated upon in advance of the needle, and a frame, the several parts being constructed and united as a unit, substantially as and for the purpose set forth.

10. In a ruffling attachment adapted to be operated by the needle-bar of a sewing-machine through the medium of an elbow or bell-crank lever, the combination, with its frame, of a horizontally-arranged reciprocating gathering-blade, substantially as set forth.

11. The combination, with a gathering attachment for sewing-machines, consisting of an elbow-lever, adapted to be operated from the needle-bar, and a reciprocating gathering-blade, of a plate, arranged in the rear of said gathering-blade, for separating the strips which are to form the ruffle from the material to which said ruffle is to be secured in advance of the formation of the gathers and the stitches for securing the same, substantially as set forth.

12. In a ruffling or gathering attachment adapted to be operated from the needle-bar of a sewing-machine, the combination of the frame, elbow-lever, reciprocating gathering-blade, and mechanism for adjusting the width of the gathers, of a plate arranged in the rear of said gathering-blade, substantially as and for the purpose set forth.

13. In a ruffling attachment for sewing-machines, the combination of a frame, an elbow-lever adapted to be operated by the needle-bar thereof, a reciprocating gathering-blade, mechanism for regulating the fullness of gathers, a plate arranged in rear of gathering-blade, and a supplemental press or pad, substantially as and for the purpose set forth.

14. In a gathering or ruffling attachment for sewing-machines, the combination of frame, elbow-lever, gathering-blade, screw and gage for regulating the fullness of gathers, a plate arranged in rear of the gathering-blade, and a supplemental presser or smoother, substantially as and for the purposes set forth.

15. In a ruffling or gathering attachment adapted to be held detachably upon a sewing-machine, the combination, with the reciprocating ruffler and the frame of the attachment, of an actuating elbow-lever adapted to be operated by a projection upon the needle-bar, substantially as and for the purposes set forth.

16. In a ruffling attachment for sewing-machines, the combination of its frame, elbow-lever, gathering-blade, screw and gage, separating-plate, supplemental presser, and mechanism for suspending the gathering-blade, substantially as and for the purpose set forth.

JOB A. DAVIS.

Witnesses:
J. W. MANIER,
I. H. JOHNSON.